United States Patent
Balasubramanian et al.

(10) Patent No.: US 8,230,192 B2
(45) Date of Patent: Jul. 24, 2012

(54) SYSTEM AND METHOD FOR QOS-BASED STORAGE TIERING AND MIGRATION TECHNIQUE

(75) Inventors: Sridhar Balasubramanian, Wichita, KS (US); Kenneth J. Fugate, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 278 days.

(21) Appl. No.: 12/700,867

(22) Filed: Feb. 5, 2010

(65) Prior Publication Data

US 2011/0197027 A1 Aug. 11, 2011

(51) Int. Cl.
*G06F 12/00* (2006.01)

(52) U.S. Cl. .................. 711/165; 711/162; 711/E12.002

(58) Field of Classification Search .................. None
See application file for complete search history.

(56) References Cited

U.S. PATENT DOCUMENTS

| | | | |
|---|---|---|---|
| 7,334,095 | B1 | 2/2008 | Fair et al. |
| 2003/0093501 | A1 | 5/2003 | Carlson et al. |
| 2007/0112870 | A1 | 5/2007 | Korupolu |
| 2008/0168228 | A1 | 7/2008 | Carr et al. |
| 2008/0301763 | A1 * | 12/2008 | Sasaki et al. ................. 726/1 |
| 2009/0024813 | A1 | 1/2009 | Uysal et al. |
| 2009/0198940 | A1 | 8/2009 | Ash et al. |
| 2010/0138620 | A1 * | 6/2010 | Jess ............... 711/162 |
| 2010/0274827 | A1 * | 10/2010 | Hix et al. ................ 707/813 |

* cited by examiner

*Primary Examiner* — Kevin Ellis
*Assistant Examiner* — Baboucarr Faal
(74) *Attorney, Agent, or Firm* — Suiter Swantz pc llo

(57) ABSTRACT

The present invention is directed to a method for providing Quality Of Service (QoS)-based storage tiering and migration in a storage system. The method allows for configurable application data latency thresholds to be set on a per user basis and/or a per application basis so that a storage tiering mechanism and/or a storage migrating mechanism may be triggered for moving application data to a different class of storage.

18 Claims, 4 Drawing Sheets

{Once Migrate is complete, all R/W is directed at Tier}

SYSTEM AND METHOD FOR QOS-BASED STORAGE TIERING AND MIGRATION TECHNIQUE

FIELD OF THE INVENTION

The present invention relates to the field of storage resource and data management and particularly to a system and method for Quality of Service (QoS)-based storage tiering and migration technique.

BACKGROUND OF THE INVENTION

Currently available methods for providing storage resource and data management in data storage systems may not provide a desired level of performance.

Therefore, it may be desirable to provide system(s) and method(s) for providing storage resource and data management in a data storage system which addresses the above-referenced shortcomings of currently available solutions.

SUMMARY OF THE INVENTION

Accordingly, an embodiment of the present invention is directed to a method for providing Quality Of Service (QoS)-based storage tiering and migration in a storage system, said method including the steps of: monitoring an application process when the application process is accessing a first storage tier of the storage system; based on said monitoring, determining a QoS factor measurement of the application process; comparing the QoS factor measurement to at least one of: a first pre-determined QoS factor threshold (ex.—a tier threshold) and a second pre-determined QoS factor threshold (ex.—a migrate threshold); when said comparing indicates that the QoS factor measurement is greater than the first pre-determined QoS factor threshold, creating a Point-in-Time (PiT) copy and establishing an access permission of the PiT copy as Read Only, wherein the PiT copy is based upon the first storage tier; when said comparing indicates that the QoS factor measurement is: less than the first pre-determined QoS factor threshold; and greater than the second pre-determined QoS factor threshold, migrating data from the PiT copy to a second storage tier; after the migrating of data from the PiT copy to the second storage tier has completed, setting establishing access permissions of the second storage tier as Read and Write and directing I/O commands to the second storage tier; when said comparing indicates that the QoS factor measurement is: less than the first pre-determined QoS factor threshold; and less than the second pre-determined QoS factor threshold, mirroring second storage tier data to the first storage tier; when mirroring of data of the second storage tier data to the first storage tier is synchronized, directing read commands to the second storage tier; when mirroring of the second storage tier data to the first storage tier is synchronized, synchronizing write commands between the first storage tier and the second storage tier.

A further embodiment of the present invention is directed to a computer program product comprising: a signal bearing medium bearing: computer-usable code configured for monitoring an application process when the application process is accessing a first storage tier of the storage system; computer-usable code configured for based on said monitoring, determining a QoS factor measurement of the application process; computer-usable code configured for comparing the QoS factor measurement to at least one of: a first pre-determined QoS factor threshold and a second pre-determined QoS factor threshold; computer-usable code configured for, when said comparing indicates that the QoS factor measurement is greater than the first pre-determined QoS factor threshold, creating a Point-in-Time (PiT) copy and establishing an access permission of the PiT copy as Read Only, wherein the PiT copy is based upon the first storage tier; computer-usable code configured for, when said comparing indicates that the QoS factor measurement is: less than the first pre-determined QoS factor threshold; and greater than the second pre-determined QoS factor threshold, migrating data from the PiT copy to a second storage tier; computer-usable code configured for, after the migrating of data from the PiT copy to the second storage tier has completed, setting establishing access permissions of the second storage tier as Read and Write and directing I/O commands to the second storage tier; computer-usable code configured for, when said comparing indicates that the QoS factor measurement is: less than the first pre-determined QoS factor threshold; and less than the second pre-determined QoS factor threshold, mirroring second storage tier data to the first storage tier; computer-usable code configured for, when minoring of data of the second storage tier data to the first storage tier is synchronized, directing read commands to the second storage tier; computer-usable code configured for, when mirroring of the second storage tier data to the first storage tier is synchronized, synchronizing write commands between the first storage tier and the second storage tier.

A still further embodiment of the present invention is directed to a storage system, including: a processor; a memory, said memory being connected to the processor; and control programming for executing on the processor, wherein the control programming is configured for: monitoring an application process when the application process is accessing a first storage tier of the storage system; based on said monitoring, determining a QoS factor measurement of the application process; comparing the QoS factor measurement to at least one of: a first pre-determined QoS factor threshold and a second pre-determined QoS factor threshold; and when said comparing indicates that the QoS factor measurement is greater than the first pre-determined QoS factor threshold, creating a Point-in-Time (PiT) copy and establishing an access permission of the PiT copy as Read Only, wherein the PiT copy is based upon the first storage tier, wherein said control programming is further configured for: when said comparing indicates that the QoS factor measurement is: less than the first pre-determined QoS factor threshold; and greater than the second pre-determined QoS factor threshold, migrating data from the PiT copy to a second storage tier; after the migrating of data from the PiT copy to the second storage tier has completed, setting establishing access permissions of the second storage tier as Read and Write and directing I/O commands to the second storage tier; when said comparing indicates that the QoS factor measurement is: less than the first pre-determined QoS factor threshold; and less than the second pre-determined QoS factor threshold, mirroring second storage tier data to the first storage tier; when mirroring of data of the second storage tier data to the first storage tier is synchronized, directing read commands to the second storage tier; when minoring of the second storage tier data to the first storage tier is synchronized, synchronizing write commands between the first storage tier and the second storage tier.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1A:
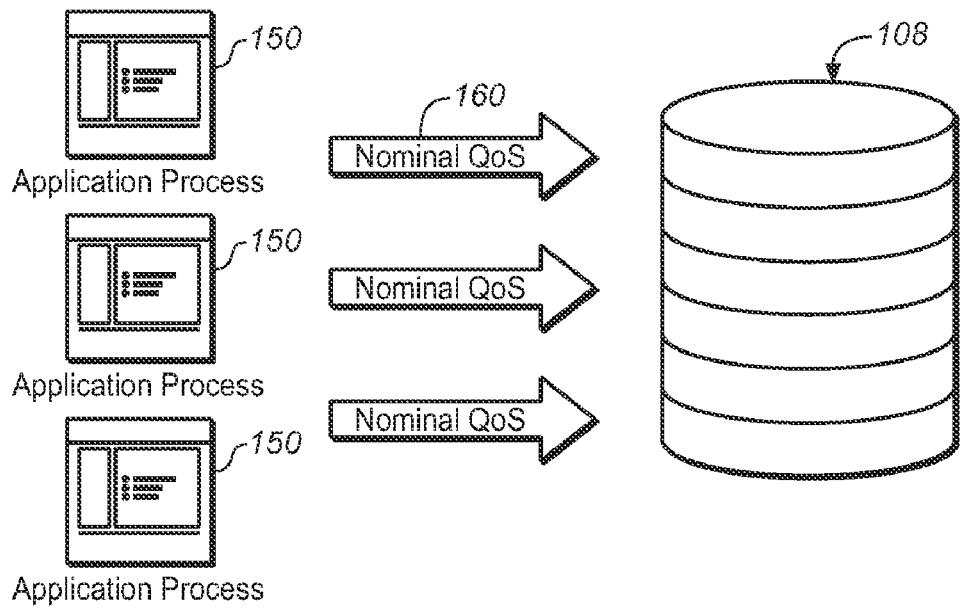
FIG. 1A is a block diagram illustration of a plurality of application processes accessing a storage pool of a storage system of the present invention at a time when QoS factors associated with the application processes are at an optimum level during runtime in accordance with an exemplary embodiment of the present invention.

Reference will now be made in detail to the presently preferred embodiments of the invention, examples of which are illustrated in the accompanying drawings.

A number of current commercially available storage tiering mechanisms may be based upon the following: 1) cost per byte of storage space; 2) data access patterns; and 3) migration and placement of less frequently accessed data to a lower class storage device. However, none of these current commercially available storage tiering mechanisms address the quality aspects pertaining to the data that a user is accessing on a day-to-day basis. Further, in these current commercially available storage tiering mechanisms no configurable Quality Of Service (QoS) parameters (Note: Quality of Service may also be abbreviated as (QoS)) are available to set the data access latency thresholds for triggering the tiering/migrating process based on application process and user data.

The system(s) and method(s) of the present invention, such as those disclosed herein, allow for configurable application data latency thresholds to be set on a per user basis and/or on a per application basis, such that a storage tiering mechanism (ex.—a storage migrating mechanism) is triggered for moving application data to a different class of storage. Further, the system(s) and method(s) of the present invention, such as those disclosed herein, may further provide the following features: 1) promoting of significant improvement in QoS levels associated with applications hosted by a storage subsystem; 2) predictable latency associated with storage access; 3) tunability, for ensuring complete utilization of storage resources which deliver the highest QoS, thereby delivering a full Return On Investment (ROI) on high performance tiers; 4) on-the-fly manual administration for improving QoS for business critical and/or time critical application needs; 5) automatic retiring of lower performing storage based upon QoS thresholds; 6) automatic migration of user and application data to a different storage tier based on QoS thresholds; 7) significant improvements in sustaining predictable application performance on shared storage; 8) significant improvement in latency associated with application specific data access; 9) automatic policy-based tiering and migration without requiring human intervention; and 10) predictive modeling and projections to recommend needed capacity of high performance tiers and lower performing tiers based on historical use. Further, the system(s) and method(s) of the present invention, such as those disclosed herein, may involve changing enterprise level configurable QoS parameters on a per user, per application basis by an administrator. Still further, the system(s) and method(s) of the present invention provide for spontaneous storage tiering and migration based on a QoS concept applied at a user level and/or an application data level.

Referring generally to FIGS. 1A, 1B and 3A through 3C, a storage system 100 upon/within which the method(s) for providing Quality of Service (QoS)-based storage tiering and migration may be implemented is shown in accordance with exemplary embodiments of the present invention. In exemplary embodiments, the storage system 100 may include a processor 102. In further embodiments, the storage system 100 may further include a memory 104 (ex.—Random Access Memory (RAM)). In still further embodiments, the storage system 100 may further include a bus 106. For instance, the processor 102 and the memory 104 may be connected to the bus 106. In current embodiments of the present invention, the storage system 100 may include a storage subsystem, which may further include a plurality of storage tiers, such as a first storage tier 108 and a second storage tier 112. Each storage tier may include one or more storage devices which make up a storage pool (ex.—a base volume 108) for that storage tier. Further, the first storage tier may be a different class of storage than the second storage tier, the two storage tiers being distinguished by the performance of the storage devices belonging to the first tier compared to the performance of the storage devices belonging to the second tier (ex.—one tier's storage devices may be higher performing storage devices than the storage devices of the other tier). In further embodiments of the present invention, the storage subsystem of the storage system 100 may be connected to the processor 102 and the memory 104 via the bus 106. In still further embodiments of the present invention, the system 100 may be configured (ex—via control programming executing on the processor 102) for allowing method(s) for providing Quality Of Service (QoS)-based storage tiering and migration to be performed via and/or within the storage system 100, as will be set forth below.

Figure 1B:
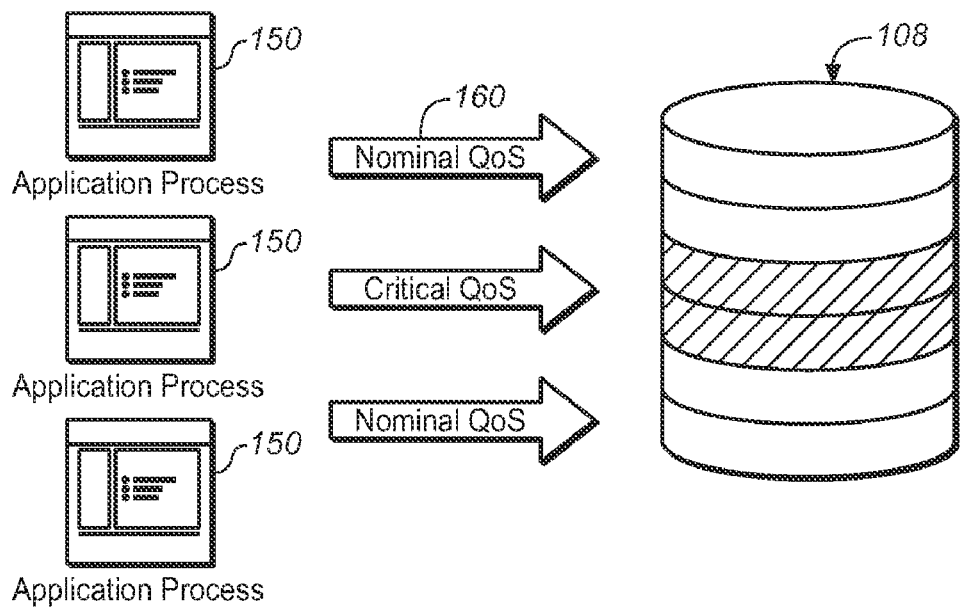
FIG. 1B is a block diagram illustration of a plurality of application processes accessing a storage pool of a storage system of the present invention at a time when a QoS factor associated with one of the application processes has degraded in accordance with an exemplary embodiment of the present invention.
Figure 4:
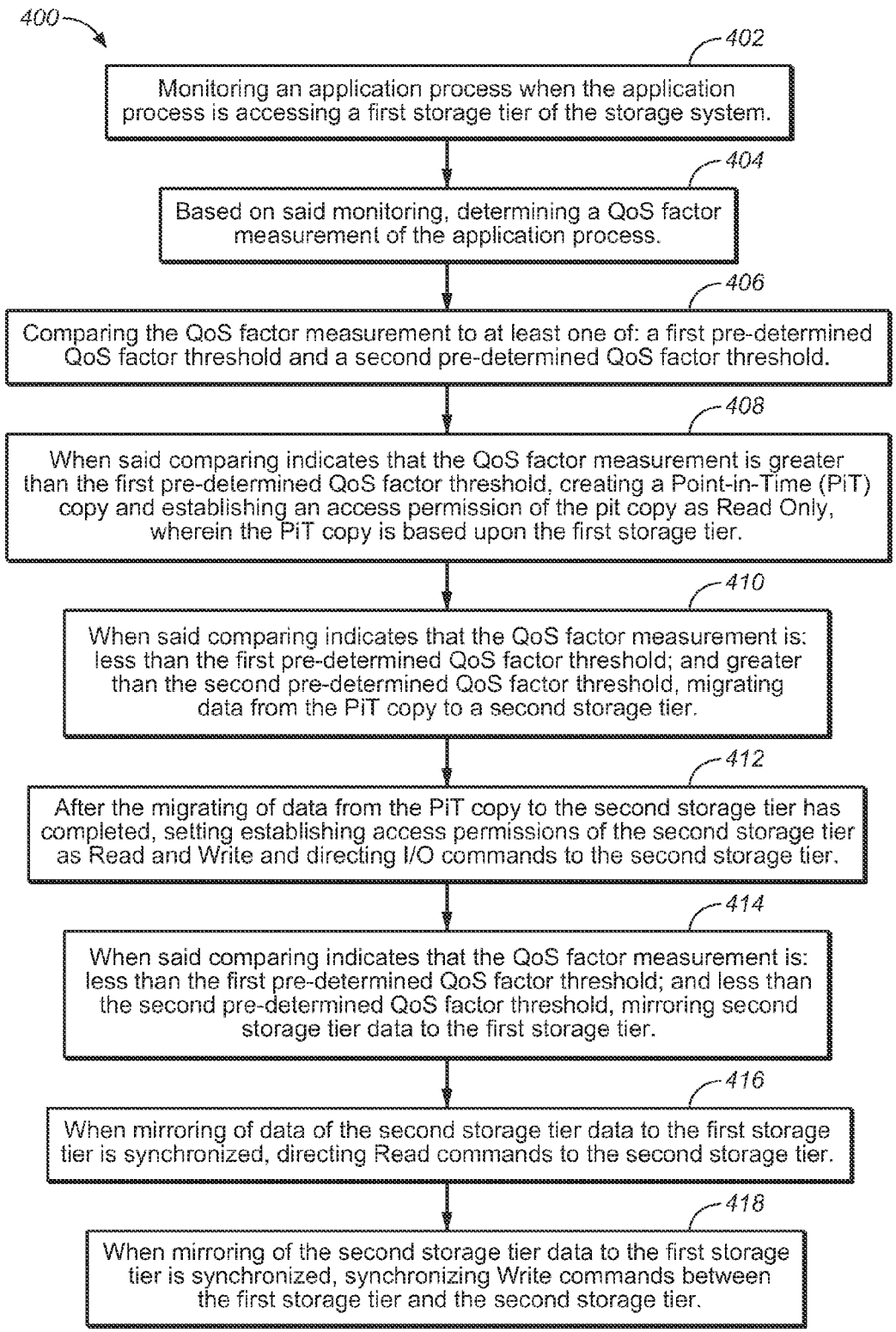
FIG. 4 depicts a flow chart illustrating a method for providing Quality of Service (QoS)-based storage tiering and migration in a storage system in accordance with a further exemplary embodiment of the present invention.

Referring to FIG. 4, a flowchart is provided which illustrates a method for providing Quality of Service (QoS)-based storage tiering and migration in a storage system, in accordance with an exemplary embodiment of the present invention. The method 400 may include the step of: monitoring an application process when the application process is accessing a first storage tier of the storage system 402. For example, in the storage system 100 of the present invention, one or more QoS factors 160 of/corresponding to one or more application processes 150 may be monitored (ex.—continuously monitored and/or sampled) as the application processes are accessing a storage pool (ex.—a base volume 108) of a first storage tier (as shown in FIGS. 1A and 1B). In exemplary embodiments of the present invention, the QoS factors 160 may be real-time QoS factors associated with/pertaining to/corresponding to the application processes 150. FIG. 1A illustrates a plurality of application processes 150 accessing the storage pool 108 of the first storage tier when QoS factors 160 are at an optimum level during runtime. Monitoring (ex.—sampling) may be done in real-time in order to keep the monitoring window open for as long as the application processes 150 are active. In current embodiments of the present invention, some of the QoS factors 160 which may govern the application processes 150 in real-time may include but are not limited to the following: read latency; write latency; storage media response time; idle time (ex.—time when no active reads/writes are performed); pervasiveness of data (ex.—data being written and read are in close proximity within an application share hosted in a storage device of the storage subsystem); data localization (ex.—degree to which particular data location(s) are being accessed compared to others); age of data; and age of application files.

Figure 2:
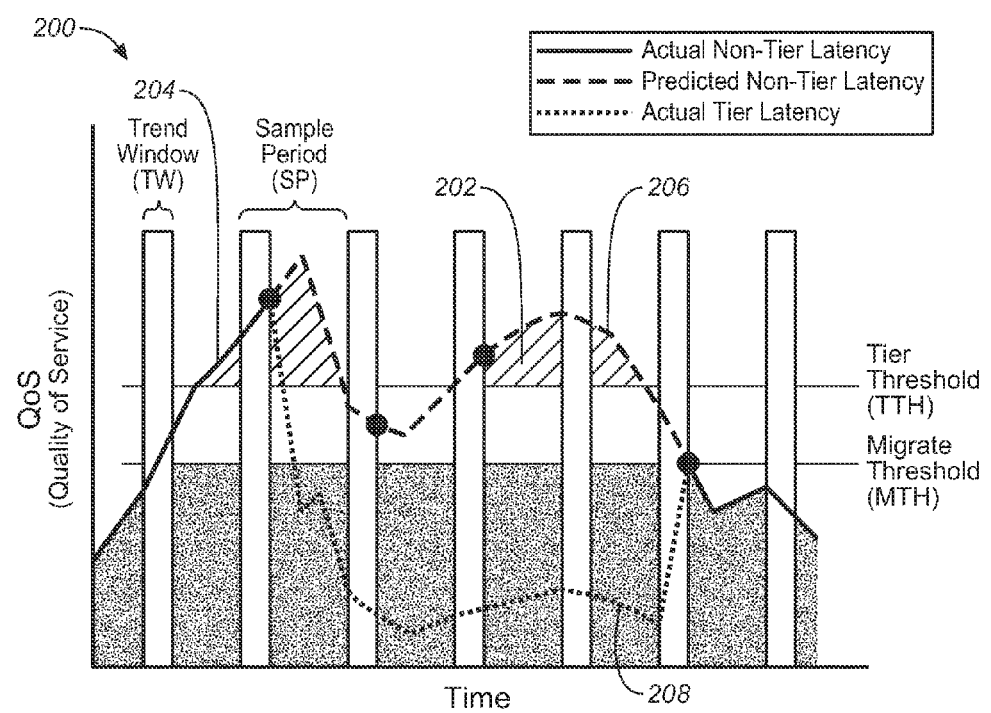
FIG. 2 is a graphical representation illustrating a QoS factor measurement plotted against sampling time, along with tier threshold and migrate threshold trigger point settings for an exemplary storage system of the present invention in accordance with an exemplary embodiment of the present invention.

In further embodiments, the method 400 may further include, based upon said monitoring, determining a QoS factor measurement of the application process 404. For instance, when QoS factor(s) 160 of (ex.—associated with) application processes 150 are being monitored, reading(s) or measurement(s) for the QoS factor(s) may be determined. These measurements (ex.—QoS factor measurements) may be continuously determined for the duration of monitoring. After a period of time, one or more QoS factor(s) 160 associated with a particular application process 150 may begin to deteriorate (as shown via the designation "Critical QoS" in FIG. 1B), thereby impacting overall QoS thresholds for that particular application process. In exemplary embodiments of the present invention, the method 400 may further include the step of: comparing the QoS factor measurement to at least one of: a first pre-determined QoS threshold (ex.—a Tier Threshold (TTH)) and a second pre-determined QoS factor threshold (ex.—a Migrate Threshold (MH)) 406. In current embodiments, these thresholds may serve as trigger points for latency aspects of the system 100. For example, based upon said comparison, the Tier Threshold and the Migrate Threshold may serve as trigger points which may trigger the system 100 to execute a sequence of steps for: a) storage tiering; or b) migrating application data to a different class of storage respectively, as will be described in further detail below. The graphical representation (ex.—graph) 200 shown in FIG. 2 illustrates a QoS level(s)/a measurement of a QoS factor (ex.—storage latency associated with application data) plotted against sampling time (ex.—monitoring time). A first region of the graph 202 illustrates a point in time when the application processes 150 are running at optimum QoS levels. Solid line 204 indicates actual non-tiered storage latency. Dashed line 206 indicates predicted non-tiered storage latency. Dotted line 208 indicates actual latency measured after application data is tiered to a different class (ex.—tier) of storage. Within the sampling period (SP), the QoS levels may be measured and compared against the trigger thresholds (ex.—the Tier Threshold (TTH) and the Migrate Threshold (MTH).

Figure 3A:
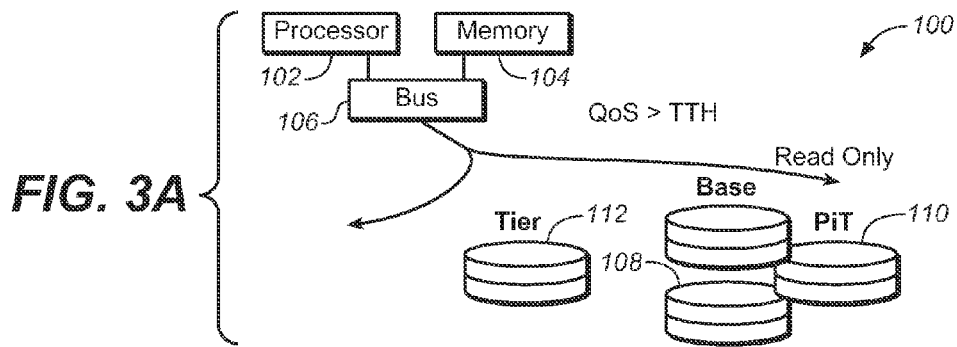
FIG. 3A is a block diagram illustration of activity (ex.—data flow) within a storage system of the present invention when comparison of the QoS factor measurement to the Tier Threshold (TTH) indicates that the QoS factor measurement is greater than the TTH, in accordance with an exemplary embodiment of the present invention.

In exemplary embodiments of the present invention, the method 400 may further include, when said comparing indicates that the QoS factor measurement is greater than the first pre-determined QoS factor threshold, creating a Point-in-Time (PiT) copy and establishing an access permission of the PiT copy as Read Only, wherein the PiT copy is based upon the first storage tier 408. For example, as shown in FIG. 3A, when the comparison of the QoS factor measurement to the Tier Threshold (TTH) indicates that the QoS factor measurement is greater than the TTH, one or more PiT copies 110 (ex.—PiT snapshots or PiTs) may be created based upon the first storage tier (ex.—may be created off of the base volume 108).

Figure 3B:
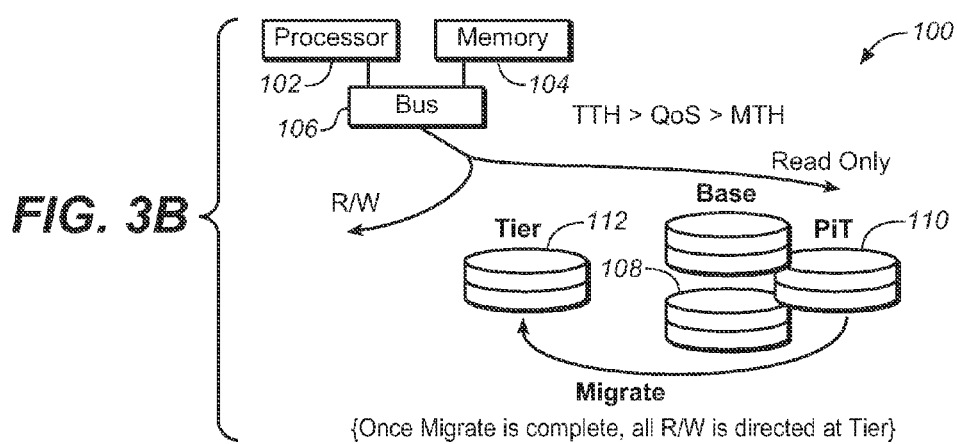
FIG. 3B is a block diagram illustration of migrating of data within a storage system of the present invention which may occur when comparison of the QoS factor measurement to the Tier Threshold (TTH) and the Migrate Threshold (MTH) indicates that the QoS factor measurement is less than the TTH, but greater than the MTH, in accordance with an exemplary embodiment of the present invention.

In further embodiments of the present invention, the method 400 may further include migrating data from the PiT copy to a second storage tier when said comparing indicates that the QoS factor measurement is: less than the first pre-determined QoS factor threshold; and greater than the second pre-determined QoS factor threshold 410. For instance, as shown in FIG. 3B, when the comparison of the QoS factor measurement to the Tier Threshold (TTH) and the Migrate Threshold (MTH) indicates that the QoS factor measurement is less than the TTH, but greater than the MTH, data may be migrated from the one or more PiT copies (ex.—PiTs) 110 to a second (ex.—next) storage tier 112. A heuristic approach may be implemented when migrating said data for promoting prevention of thrashing in cases when the QoS factor measurement(s) (ex.—the QoS) may fluctuate quickly between thresholds.

In current embodiments of the present invention, the method 400 may further include, after the migrating of data from the PiT copy to the second storage tier has completed, setting establishing access permissions of the second storage tier as Read and Write and directing I/O commands to the second storage tier 412. For example, once all the data from the one or more PiT copies 110 has been migrated to the second storage tier 412, incoming I/Os may be re-directed to and serviced by the second storage tier 112, with the access permissions of the second storage tier 112 being set to Read and Write (R/W) and PiT copies being continuously generated off of the base volume 108.

Figure 3C:
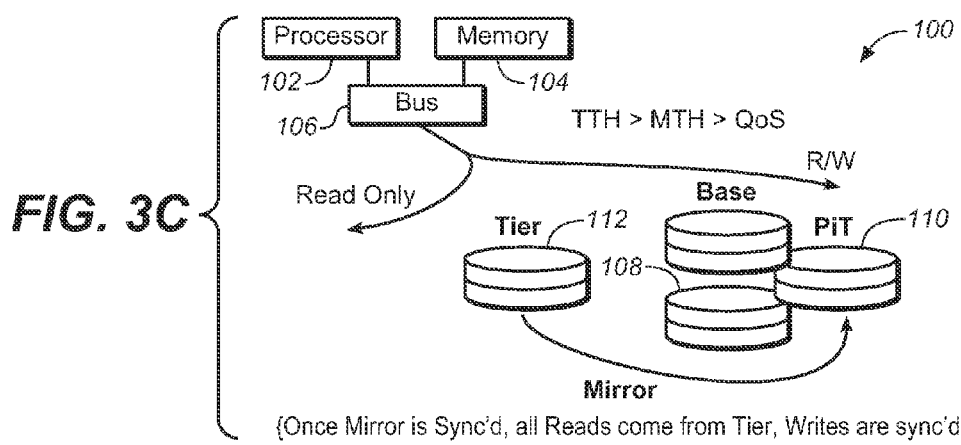
FIG. 3C is a block diagram illustration of mirroring of data within a storage system of the present invention which may occur when comparison of the QoS factor measurement to the Tier Threshold (TTH) and the Migrate Threshold (MTH) indicates that the QoS factor measurement is less than the TTH and less than the MTH.

In exemplary embodiments of the present invention, the method 400 may further include, when said comparing indicates that the QoS factor measurement is: less than the first pre-determined QoS factor threshold; and less than the second pre-determined QoS factor threshold, mirroring second storage tier data to the first storage tier 414. For instance, as shown in FIG. 3C, when the comparison of the QoS factor measurement to the Tier Threshold (TTH) and the Migrate Threshold (MTH) indicates that the QoS factor measurement is less than the TTH and less than the MTH, data in the second storage tier 112 may be mirrored to the first storage tier 108. A heuristic approach may be implemented when mirroring said data in order to prevent thrashing between thresholds.

In further embodiments of the present invention, the method 400 may further include, when mirroring of data of the second storage tier data to the first storage tier is synchronized, directing read commands to the second storage tier 416 and synchronizing write commands between the first storage tier and the second storage tier 418. For example, when mirroring (ex.—mirror) is synchronized, all reads may be serviced by the second tier 112 and all writes may be synchronized between the base volume 108 and the second tier 112.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing Quality of Service (QoS)-based storage tiering and migration in a storage system, said method comprising:
    monitoring an application process when the application process is accessing a first storage tier of the storage system;
    based on said monitoring, determining a QoS factor measurement of the application process;
    comparing the QoS factor measurement to at least one of: a first pre-determined QoS factor threshold and a second pre-determined QoS factor threshold; and
    when said comparing indicates that the QoS factor measurement is greater than the first pre-determined QoS factor threshold, creating a Point-in-Time (PiT) copy and establishing an access permission of the PiT copy as Read Only, wherein the PiT copy is based upon the first storage tier, when said comparing indicates that the QoS factor measurement is less than the first pre-determined QoS factor threshold and greater than the second pre-determined QoS factor threshold, migrating data from the PiT copy to a second storage tier.

2. A method as claimed in claim 1, further comprising: after the migrating of data from the PiT copy to the second storage tier has completed, setting establishing access permissions of the second storage tier as Read and Write and directing I/O commands to the second storage tier.

3. A method as claimed in claim 2, further comprising:
    when said comparing indicates that the QoS factor measurement is: less than the first pre-determined QoS factor threshold; and less than the second pre-determined QoS factor threshold, mirroring second storage tier data to the first storage tier.

4. A method as claimed in claim 3, further comprising:
    when mirroring of data of the second storage tier data to the first storage tier is synchronized, directing read commands to the second storage tier.

5. A method as claimed in claim 4, further comprising:
    when mirroring of the second storage tier data to the first storage tier is synchronized, synchronizing write commands between the first storage tier and the second storage tier.

6. A method as claimed in claim 1, wherein the QoS factor measurement is based upon a QoS factor of the storage system, said QoS factor being at least one of: read latency; write latency; storage media response time; idle time; data pervasiveness; data localization; age of data; and age of application files.

7. A method as claimed in claim 1, wherein the first pre-determined QoS factor threshold is a tier threshold and the second pre-determined QoS factor threshold is a migrate threshold.

8. A computer program product comprising:
    a non transitory signal bearing medium bearing:
    computer-usable code configured for monitoring an application process when the application process is accessing a first storage tier of a storage system;
    computer-usable code configured for, based on said monitoring, determining a QoS factor measurement of the application process;
    computer-usable code configured for comparing the QoS factor measurement to at least one of: a first pre-determined QoS factor threshold and a second pre-determined QoS factor threshold; and
    computer-usable code configured for, when said comparing indicates that the QoS factor measurement is greater than the first pre-determined QoS factor threshold, creating a Point-in-Time (PiT) copy and establishing an access permission of the PiT copy as Read Only, wherein the PiT copy is based upon the first storage tier and computer-usable code configured for, when said comparing indicates that the QoS factor measurement is less than the first pre-determined QoS factor threshold and greater than the second pre-determined QoS factor threshold, migrating data from the PiT copy to a second storage tier.

9. A computer program product as claimed in claim 8, the signal-bearing medium further bearing: computer-usable code configured for, after the migrating of data from the PiT copy to the second storage tier has completed, setting establishing access permissions of the second storage tier as Read and Write and directing I/O commands to the second storage tier.

10. A computer program product as claimed in claim 9, the signal-bearing medium further bearing:
    computer-usable code configured for, when said comparing indicates that the QoS factor measurement is: less than the first pre-determined QoS factor threshold; and less than the second pre-determined QoS factor threshold, mirroring second storage tier data to the first storage tier.

11. A computer program product as claimed in claim 10, the signal-bearing medium further bearing:

computer-usable code configured for, when mirroring of data of the second storage tier data to the first storage tier is synchronized, directing read commands to the second storage tier.

12. A computer program product as claimed in claim 11, the signal-bearing medium further bearing:

computer-usable code configured for, when mirroring of the second storage tier data to the first storage tier is synchronized, synchronizing write commands between the first storage tier and the second storage tier.

13. A computer program product as claimed in claim 8, wherein the QoS factor measurement is based upon a QoS factor of the storage system, said QoS factor being at least one of: read latency; write latency; storage media response time; idle time; data pervasiveness; data localization; age of data; and age of application files.

14. A computer program product as claimed in claim 8, wherein the first pre-determined QoS factor threshold is a tier threshold and the second pre-determined QoS factor threshold is a migrate threshold.

15. A storage system, comprising:

a processor;

a memory, said memory being connected to the processor; and control programming for executing on the processor, wherein the control programming is configured for: monitoring an application process when the application process is accessing a first storage tier of the storage system; based on said monitoring, determining a QoS factor measurement of the application process; comparing the QoS factor measurement to at least one of: a first pre-determined QoS factor threshold and a second pre-determined QoS factor threshold; and when said comparing indicates that the QoS factor measurement is greater than the first pre-determined QoS factor threshold, creating a Point-in-Time (PiT) copy and establishing an access permission of the PiT copy as Read Only, wherein the PiT copy is based upon the first storage tier, when said comparing indicates that the QoS factor measurement is less than the first pre-determined QoS factor threshold and greater than the second pre-determined QoS factor threshold, migrating data from the PiT copy to a second storage tier.

16. A storage system as claimed in claim 15, wherein said control programming is further configured for: after the migrating of data from the PiT copy to the second storage tier has completed, setting establishing access permissions of the second storage tier as Read and Write and directing I/O commands to the second storage tier; when said comparing indicates that the QoS factor measurement is less than the first pre-determined QoS factor threshold and less than the second pre-determined QoS factor threshold, mirroring second storage tier data to the first storage tier; when mirroring of data of the second storage tier data to the first storage tier is synchronized, directing read commands to the second storage tier; when mirroring of the second storage tier data to the first storage tier is synchronized, synchronizing write commands between the first storage tier and the second storage tier.

17. A storage system as claimed in claim 15, wherein the QoS factor measurement is based upon a QoS factor of the storage system, said QoS factor being at least one of: read latency; write latency; storage media response time; idle time; data pervasiveness; data localization; age of data; and age of application files.

18. A storage system as claimed in claim 15, wherein the first pre-determined QoS factor threshold is a tier threshold and the second pre-determined QoS factor threshold is a migrate threshold.

* * * * *